United States Patent [19]

Ikoma et al.

[11] Patent Number: 5,077,149

[45] Date of Patent: Dec. 31, 1991

[54] NICKEL/HYDROGEN STORAGE BATTERY AND METHOD OF MANUFACTURING THE SAME

[75] Inventors: Munehisa Ikoma, Nara; Masashi Enokido, Fujisawa; Yasuko Ito, Kyoto; Shingo Tsuda, Fujisawa, all of Japan

[73] Assignee: Matsushita Electric Industrial Co., Ltd., Osaka, Japan

[21] Appl. No.: 674,186

[22] Filed: Mar. 25, 1991

[30] Foreign Application Priority Data

Sep. 26, 1990 [JP] Japan .................. 2-258015

[51] Int. Cl.$^5$ ............................................ H01M 4/36
[52] U.S. Cl. ..................................... 429/101; 429/206; 429/218; 429/223; 29/623.5
[58] Field of Search ............... 429/101, 206, 218, 223, 429/59, 229; 420/900; 252/182.1; 29/623.5; 204/2.1

[56] References Cited

U.S. PATENT DOCUMENTS

| | | | |
|---|---|---|---|
| 4,251,603 | 2/1981 | Matsumoto et al. | 429/94 |
| 4,582,098 | 4/1986 | Matsumoto et al. | 141/1.1 |
| 4,605,603 | 8/1986 | Kanada et al. | 429/59 |
| 4,837,119 | 6/1989 | Ikoma et al. | 429/206 |
| 4,925,748 | 5/1990 | Ikoma et al. | 429/59 |
| 4,935,318 | 6/1990 | Ikoma et al. | 429/206 |
| 4,977,043 | 12/1990 | Kadouchi et al. | 429/54 |
| 5,008,164 | 4/1991 | Furukawa et al. | 429/218 X |

FOREIGN PATENT DOCUMENTS 59-83347 5/1984 Japan .
62-66569 3/1987 Japan .

Primary Examiner—Anthony Skapars
Attorney, Agent, or Firm—Stevens, Davis, Miller & Mosher

[57] ABSTRACT

A nickel/hydrogen storage battery comprises a nickel positive electrode having nickel oxide as a main active material, a negative electrode mainly composed of a hydrogen absorbing alloy capable of carrying out the electrochemical hydrogen absorbing and desorbing reaction, an alkaline electrolyte, and a separator, a zinc compound being contained in the nickel positive electrode, the negative electrode and the separator.

The content of the zinc compound in terms of zinc oxide is 30–500 mg per Ah of battery capacity in the nickel positive electrode and 0.3–15 mg in the negative electrode and the separator.

Thus, the expansion of the nickel positive electrode can be inhibited and the electrolyte retention of the negative electrode and the separator can be improved and the cycle life of the battery can be prolonged.

11 Claims, 3 Drawing Sheets

NICKEL/HYDROGEN STORAGE BATTERY AND METHOD OF MANUFACTURING THE SAME

BACKGROUND OF THE INVENTION

1. FIELD OF THE INVENTION

The present invention relates to a nickel/hydrogen storage battery in which is used a hydrogen absorbing alloy capable of carrying out the electrochemical hydrogen absorbing and desorbing reaction, as a negative electrode, and more particularly to improvement of its battery characteristics.

2. DESCRIPTION OF RELATED ART

A lead storage battery and a nickel/cadmium storage battery (hereinafter referred to as a "Ni-Cd battery") have been put to practical use at present and widely used in portable apparatuses. The lead storage battery is inexpensive but generally low in energy density per unit weight (Wh/kg) and has problems in cycle life and is not suitable as an electric source for portable apparatuses of a small size and light weight.

On the other hand, the Ni-Cd battery is higher than the lead storage battery in energy density per unit weight and superior in reliability of cycle life and hence it is widely used as an electric source for various portable apparatuses.

However, novel secondary batteries having the reliability similar to that of the Ni-Cd battery and high in energy density have been desired as an electric source for portable apparatuses. Recently, a nickel/hydrogen storage battery in which is used as a negative electrode a hydrogen absorbing alloy capable of carrying out the electrochemical absorbing and desorbing reaction (charging and discharging reaction) of hydrogen which is an active material of a negative electrode (hereinafter referred to as a "hydrogen absorbing alloy negative electrode") in place of the cadmium negative electrode of the Ni-Cd battery has been noticed as a novel secondary battery of high capacity.

Since the hydrogen absorbing alloy negative electrode is higher than the cadmium negative electrode in energy density per unit volume, when a battery having a constant internal volume and controlled in positive electrode capacity is constructed using the hydrogen absorbing alloy negative electrode, this battery has a higher battery capacity than that of the Ni-Cd battery due to the increase of volume of a nickel positive electrode.

As explained above, the nickel/hydrogen storage battery can be expected to be enhanced in capacity than the Ni-Cd battery but has a problem in cycle life charactreristics. This problem is caused by (1) Since materials to constitute the battery, such as the active material of the positive electrode and etc., are filled in a battery case of a given volume, in a larger amount than in the conventional batteries, the space volume of the battery is decreased and it is impossible to add an electrolyte necessary for satisfying the above characteristics.

(2) Owing to the increase in capacity of the nickel positive electrode, the current density increases at the same charging rate as in the Ni-Cd battery. As a result, the nickel positive electrode is more ready to produce a $\gamma$-type nickel oxyhydroxide having a higher expansion coefficient than that of a $\beta$-type nickel oxyhydroxide at the time of charging, than the conventional Ni-Cd battery. Due to this expansion of the positive electrode, a separator is more easily compressed in the nickel/hydrogen storage battery than in the conventional Ni-Cd battery. Therefore, as compared with the conventional Ni-Cd battery, the electrolyte in the separator and negative electrode is absorbed in the positive electrode by repetition of charging and discharging cycle and the distribution of the electrolyte in the battery changes and thus the internal resistance is apt to increase.

These problems are also seen in the Ni-Cd battery which has been increased in capacity, and generally in order to reduce the expansion of the positive electrode occuring due to repetition of charging and discharging in the Ni-Cd battery, cadmium oxide or cadmium hydroxide is added to the positive electrode to inhibit the production of the $\gamma$-type nickel oxyhydroxide at the time of charging. Furthermore, in order to control the expansion of the positive electrode, it has been proposed to add calcium hydroxide to the surface of the nickel positive electrode (Japanese Patent Kokai (Laid-Open) No. Sho 62-66569) and to add zinc, zinc oxide and zinc hydroxide together with the positive electrode active material (Japanese Patent Kokai (Laid-Open) No. Sho 59-83347).

When an enclosed nickel/hydrogen storage battery is constructed by mere combination of the nickel positive electrode proposed for the Ni-Cd battery as mentioned above with the hydrogen absorbing alloy negative electrode, there is a problem that most of the electrolyte migrates into the positive electrode due to expansion of the positive electrode to cause change in distribution of the electrolyte in the battery and increase of the internal resistance and, as a result, such battery is inferior in cycle life characteristics to the Ni-Cd battery which is now practically used. When a nickel positive electrode containing cadmium oxide, calcium hydroxide, zinc oxide or the like is used, the expansion of the positive electrode is inhibited also in the nickel/hydrogen storage battery, but the inhibition effect is not so high as in the Ni-Cd battery because the nickel/hydrogen storage battery is higher in capacity than the Ni-Cd battery. Besides, the cadmium oxide added to the positive electrode is partially dissolved in an alkaline electrolyte and, hence, the cadmium oxide is precipitated on the alloy surface of the hydrogen absorbing alloy negative electrode upon repetition of charging and discharging. This causes the reduction of the absorbing ability of the hydrogen absorbing alloy to result in further the reduction of cycle life.

SUMMARY OF THE INVENTION

The object of the present invention is to provide a nickel/hydrogen storage battery which is improved in battery cycle life characteristics and has a good reliability with a simple construction.

Another object is to provide a simple method of producing the storage battery.

According to the present invention, there is provided a nickel/hydrogen storage battery which comprises a nickel positive, electrode having a nickel oxide as a main active material; a negative, electrode mainly composed of a hydrogen absorbing alloy capable of carrying out the electrochemical absorbing and desorbing reaction of hydrogen; an alkaline electrolyte; and a separator, characterized in that the nickel positive electrode, the negative electrode and the separator contain a zinc compound.

DETAILED DESCRIPTION OF THE INVENTION

Figure 1:
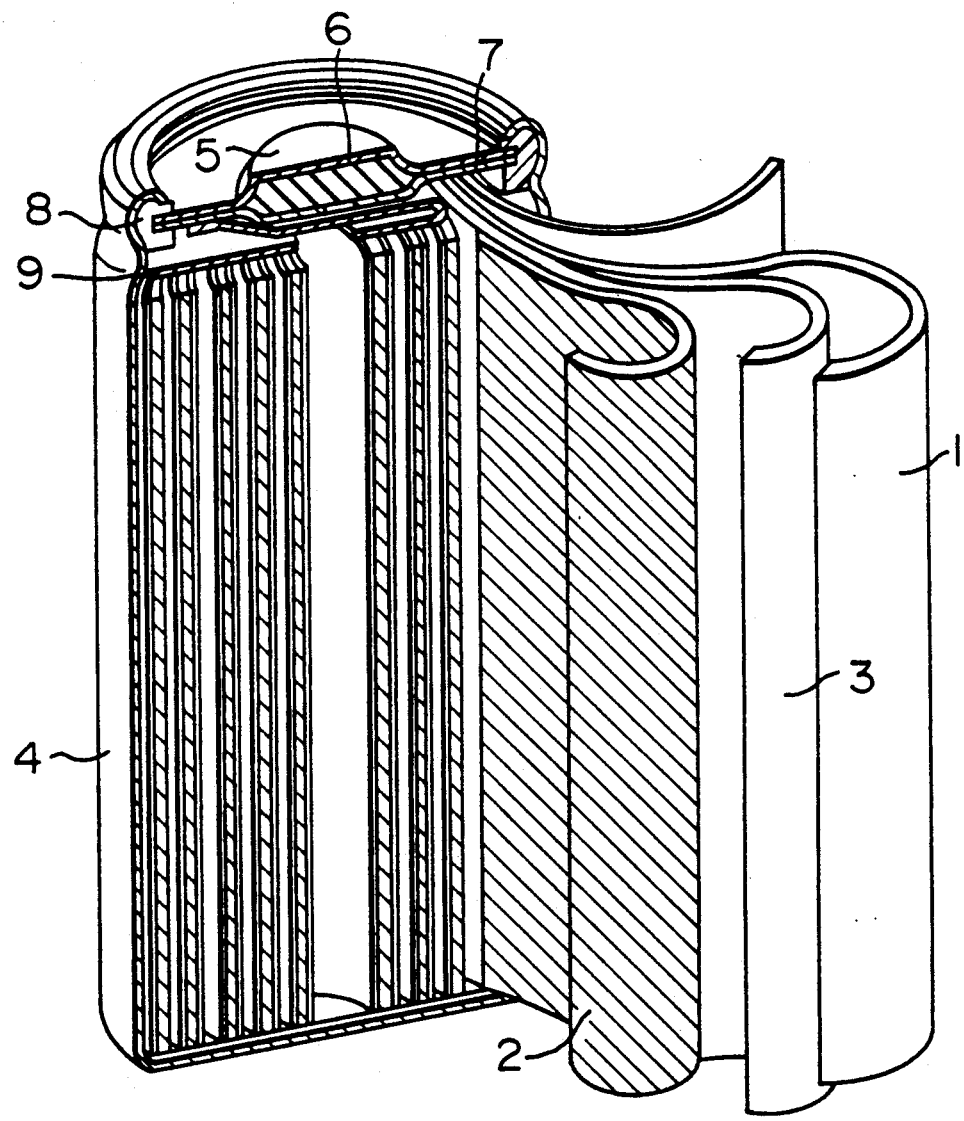
FIG. 1 is a cross-sectional view of a nickel/hydrogen storage battery according to the present invention.

For attaining the above object the present invention provides a nickel/hydrogen storage battery comprising a nickel positive electrode containing a nickel oxide as a main active material, a negative electrode mainly composed of a hydrogen absorbing alloy capable of carrying out the electrochemical hydrogen absorbing and desorbing reaction, an alklaine electrolyte and a separator, wherein a zinc compound is contained in the nickel positive electrode, the negative electrode and the separator.

Furthermore, for solving the above problems the present invention also provides a method for producing a nickel/hydrogen storage battery which comprises a nickel positive electrode containing nickel oxide as an active material, a negative electrode mainly composed of a hydrogen absorbing alloy capable of carrying out the electrochemical hydrogen absorbing and desorbing reaction, an alkaline electrolyte and a separator wherein the nickel positive electrode, the negative electrode and the separator contain a zinc compound, characterized by including the step of adding the zinc compound to at least one of the negative electrode and the separator, the step of constructing the battery using the negative electrode, the separator and the electrolyte to one of which is added the zinc compound and the the positive electrode, and the step of migrating the zinc compound into the positive electrode by initial charging and discharging to distribute the zinc compound in the battery at a given rate.

By employing the above construction, the zinc compound present in the negative electrode and the separator bonds to or coordinates with hydroxide ion in the electrolyte and the electrolyte can be retained in the negative electrode and the separator, and the electrolyte does not migrate into the positive electrode even by repetition of charginng and discharging cycle and the internal resistance does not increase.

Furthermore, the zinc compound contained in the positive electrode is present as zinc oxide in the form of a solid solution, oxide or hydroxide in the nickel hydroxide which is a main active material. In some case, it may be present in the form of zincate ion in the positive electrode or in the active material of the positive electrode. The zinc compound inhibits the production of the γ-type nickel oxyhydroxide and reduces the expansion coefficient of the positive electrode.

Moreover, according to the production method of the present invention, the zinc compound is added to either the negative electrode, separator or electrolyte and this zinc compound is migrated into the positive electrode by initial charging and discharging of battery, whereby the zinc compound is very uniformly absorbed in the active material of the positive electrode. As a result, the production of the γ-type nickel oxyhydroxide in charging can be more efficiently inhibited, and the expansion coefficient of the positive electrode can be more efficiently reduced than when the zinc oxide is added before construction of the battery.

For the above reasons, the nickel/hydrogen storage battery can be obtained in which the distribution of the electrolyte in the battery at the initial state of charging and discharging can be maintained even after repetition of charging and discharging cycle and increase of the internal resistance in the battery is restrained to provide superior cycle life characteristics.

The present invention will be explained with reference to the following examples.

Example 1

A hydrogen absorbing alloy powder for the negative electrode used in this example was prepared in the following manner. The composition of the alloy was MmNi$_{3.55}$ Co$_{0.75}$Mn$_{0.4}$Al$_3$. Each material of misch metal, Mm, which is a mixture of rare earth elements, and Ni, Co, Mn and Al compounds was charged into an arc furnace. The arc furnace was placed under the vacuum state of $10^4 - 10^{-5}$ Torr and then the materials were subjected to arc discharging under reduced pressure in argon gas atmosphere, to thereby heat and melt the materials. In order to attain the homogenization of the melt, they were heat treated at 1050 °C for 6 hours under vacuum. The resulting alloy mass was coarsely ground and thereafter the powder of 20 μm in average particle size was obtained by a wet ball mill. The powder was treated in a 7.2 mol aqueous potassium hydroxide solution at 80° C. for 1 hour with stirring and then washed with water to remove potassium hydroxide from the alloy powder and dried to obtain the hydrogen absorbing alloy powder used for the negative electrode. The hydrogen absorbing alloy and a zinc oxide powder were mixed at a weight ratio of 99.9:0.1 and then water was added to the mixture to obtain a paste. This paste was filled in a foamed nickel porous matrix having a porosity of 95% and the porous matrix was dried, pressed and thereafter cut to a given size. A powder of a hydrophobic resin such as a fluoro-resin was coated on the surface of an electrode plate to make the hydrogen absorbing alloy negative electrode. The thus obtained negative electrode contained 10 mg of the zinc oxide powder.

A positive electrode was prouced in the following manner. A spherical nickel hydroxide powder, cobalt powder, cobalt hydroxide powder and zinc oxide powder were mixed at a weight ratio of 100:7:5:2 and water was added to the mixture to obtain a paste. This paste was filled in a foamed nickel porous matrix having a porosity of 95% which was an electrode substrate and the porous matrix was dried, pressed and then cut to a given size to obtain the nickel positive electrode. The thus obtained positive electrode contained the zinc oxide powder in an amount of 80 mg per Ah of capacity of battery. A separator was formed of a sulfonated polypropylene non-woven fabric obtained by sulfonation of a polypropylene non-woven fabric and this was dipped in an aqueous solution in which a zinc oxide powder was dispersed and then dried. Thereafter, the separator was coated with a hydrophobic resin such as a fluoro-resin and cut to a given size to obtain the separator containing 10 mg of the zinc oxide powder.

The thus produced negative electrode 1 and positive electrode 2 between which separator 3 was inserted were spirally rolled and inserted in case 4 which also acted as a terminal of the negative electrode. Then, 2.4 cm$^3$ of an alkaline electrolyte prepared by dissolving 40 g/l of LiOH.H$_2$O in a 31 wt% aqueous potassium hydroxide solution was poured therein and case 4 was sealed by a sealing plate provided with a safety vent, to thereby construct an enclosed nickel/hydrogen storage battery of 4/5A size having a capacity of 1400 mAh. The construction of the thus obtained battery is shown in FIG. 1. In FIG. 1, safety vent 6 formed inside a positive electrode cap indicated by reference number 5 is the same as that of the Ni-Cd battery. The reference number 8 indicates an insulation gasket and reference number 9 indicates a current collector which electrically connected positive electrode 2 and sealing plate 7. As comparative examples, the following three batteries were produced with the same construction as of FIG. 1.

Comparative Example 1:
  In this battery, the positive electrode, negative electrode and separator did not contain zinc oxide.

Comparative Example 2:
  In this battery, only the positive electrode contained zinc oxide in the same amount as in Example 1.

Comparative Example 3:
  In this battery, only the positive electrode contained cadmium oxide in the same amount as in Example 1.

These batteries were subjected to cycle life test under the following conditions. That is, charging was carried out by 130% of positive electrode capacity with charging current of 1 CmA at 0° C and continuous discharging was carried out until 0.8 V with a discharging current of 1 CmA (constant).

Figure 2:
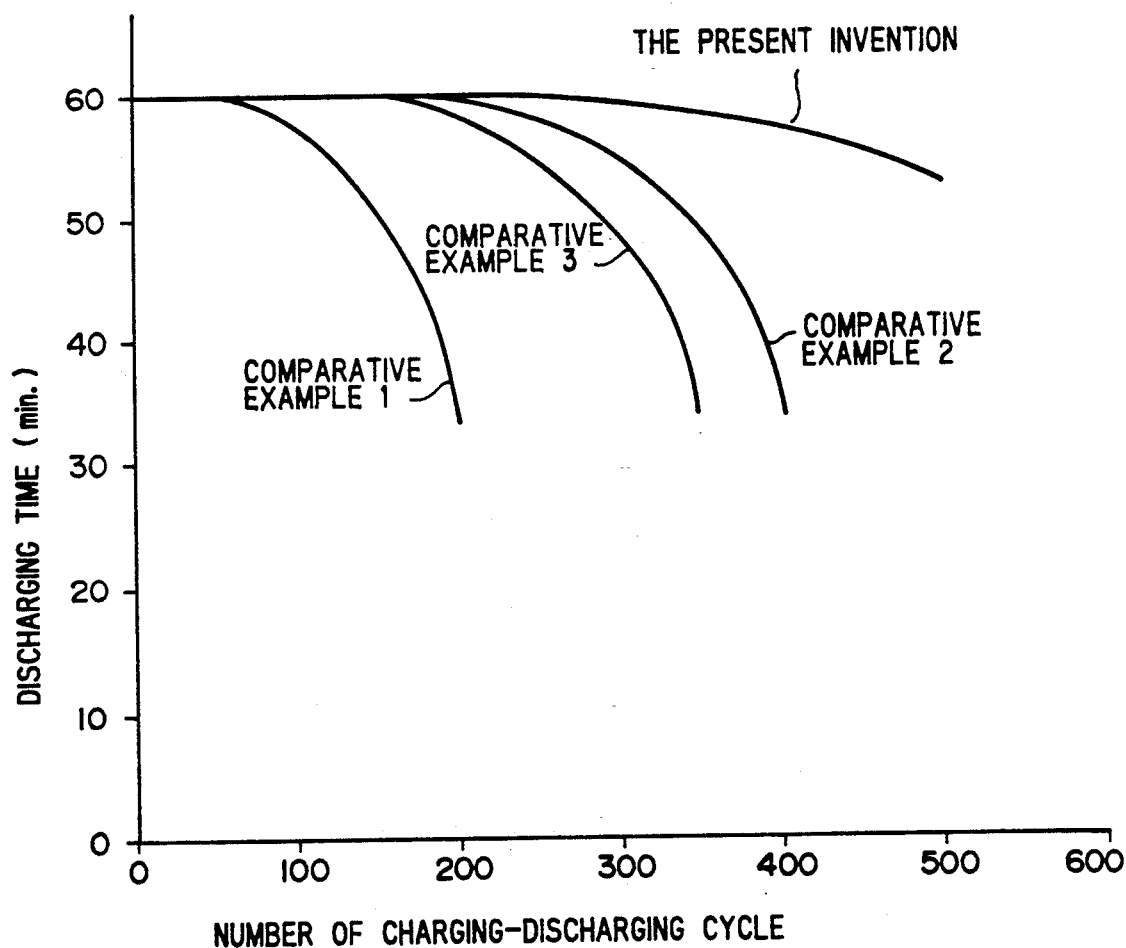
FIG. 2 is a graph which shows the relation between the number of charging and discharging cycle and the discharge time of the battery of the present invention wherein zinc oxide was contained in the positive electrode, negative electrode and separator and of the batteries of comparative Examples 1-3.

FIG. 2 shows the relation between the number of charging and discharging and the discharge time as a result of the cycle life test conducted on the battery of Example 1 of the present invention and the batteries of Comparative Examples 1, 2 and 3 under the above conditions.

It can be seen that the battery of the present invention showed substantially no reduction in capacity even after repetition of 500 charging and discharging cycles. On the other hand, the batteries of Comparative Example 1, Comparative Example 2 and Comparative Example 3 showed reduction in capacity after repetition of about 200 cycles, about 400 cycles and about 350 cycles, respectively. In the case of the battery of Comparative Example 1, the reduction of capacity was brought about because zinc oxide was not added and so, the expansion of the positive electrode was not inhibited and the negative electrode and the separator were compressed due to the expansion of the positive electrode and the electrolyte could not be retained therein and the electrolyte migrated into the positive electrode to cause increase in the internal resistance of the battery. In the case of the battery of Comparative Example 2, since zinc oxide was added to the positive electrode, the expansion of the electrode was inhibited and the cycle life was improved. However, in the case of the positive electrode to which zinc oxide was added, the positive electrode also expanded due to repetition of charging and discharging and, hence, the electrolyte in the negative electrode and the the separator migrated to the positive electrode to cause increase in the internal resistance of the battery and reduction in capacity. In the case of the battery of Comparative Example 3, since cadmium oxide was added, the expansion of the positive electrode was inhibited and the cycle life was improved over that of the battery of Comparative Example 1, but cadmium in the positive electrode gradually precipitated on the surface of the hydrogen absorbing alloy of the negative electrode and, as a result, the charging efficiency of the negative electrode decreased and hydrogen gas was generated from the negative electrode at the time of charging and this opened the safety vent to reduce the amount of the electrolyte, whereby the internal resistance of the battery increased to cause reduction in capacity.

On the other hand, the battery of the present invention showed substantially no reduction in capacity even after repetition of 500 charging and discharging cycles since the zinc oxide added inhibits the expansion of the positive electrode and improves ability to retain the electrolyte in the separator and the negative electrode.

Distribution of the electrolyte in the battery is preferably at a positive electrode: negative electrode: separator ratio of 4–6 : 2–4 : 1–3. When the ratio of the amount of the electrolyte in the positive electrode is more than 6 in the proportion, the life characteristics are lower. On the other hand, when it is less than 4, discharge time decreases. When the ratio of the amount of the electrolyte in the negative electrode is more than 4, there occur increase of the internal pressure of the battery at the time of charging and reduction of life. When the ratio is less than 2, the discharge time decreases. When the ratio of the amount of the electrolyte in the separator is more than 3, the increase of the internal pressure of the battery at the time of charging and reduction of life are brought about. When the ratio is less than 1, the life and discharge time decrease.

The composition of the positive electrode is preferably 3–10 parts by weight of cobalt and 2–15 parts by weight of cobalt hydroxide per 100 parts by weight of nickel hydroxide from the point of discharging time. If cadmium oxide is added in an amount of more than 0.2 part by weight, the life characteristics deteriorate and the amount added is preferably 0.2 part by weight or less.

When the concentration of the electrolyte is less than 26% by weight, the discharge time decreases and when it is more than 36% by weight, the life reduces. When the amount of lithium hydroxide (LiOH) is less than 10 g/l, the discharge voltage lowers. Therefore, the alkaline electrolyte preferably comprises a 26–36 wt% aqueous solution of potassium hydroxide or potassium hydroxide and sodium hydroxide which contains 10 g/l or more of lithium hydroxide.

EXAMPLE 2

Positive electrodes were prepared in the same manner as in Example 1 changing the amount of zinc oxide so that the amount of zinc oxide added was 20, 30, 50, 100, 200, 300, 500, and 550 mg per Ah of capacity of battery. As a negative electrode and separator to be combined with these positive electrodes, those which were the same as used in Example 1 which contained 10 mg of zinc oxide, respectively were used. Batteries were constructed by the same method as in Example 1 using these positive electrodes, negative electrodes and separators and were examined on the number of charging and discharging cycle (before deterioration to 40% of the initial discharge time) and discharge time in the first cycle. The results are shown in Table 1.

TABLE 1

Relation between the amount of zinc oxide added and the number of charging and discharging cycle and the discharge time

| Battery | Amount of zinc oxide | Number of charging and discharging cycle | Discharge time |
|---------|---------------------|------------------------------------------|----------------|
| A | 20 mg | 350 cycles | 63 min |
| B | 30 mg | 450 cycles | 63 min |
| C | 50 mg | 500 cycles | 63 min |
| D | 100 mg | 650 cycles | 60 min |
| E | 200 mg | 700 cycles | 60 min |
| F | 300 mg | 800 cycles | 59 min |
| G | 500 mg | 900 cycles | 52 min |
| H | 550 mg | 850 cycles | 45 min |

As is clear from Table 1, when the amount of zinc oxide in the positive electrode was 30-500 mg per Ah of battery capacity, the number of charging and discharging cycle was 450-900 cycles and the discharge time was 52-63 minutes and these results were good. However, when the amount of zinc oxide was 20 mg (battery A), the cycle life shortened to 350 cycles. Furthermore, when the amount of zinc oxide was 550 mg (battery H), the cycle life was superior, namely, 850 cycles while the discharge time reduced to 45 minutes.

Therefore, from the points of both the cycle life and discharge time, the amount of zinc oxide added to the positive electrode is preferably about 30-500 mg per Ah of battery capacity. The reason for the cycle life being short when the amount of zinc oxide added is 20 mg (battery A) is that the expansion of the positive electrode cannot be inhibited owing to the small amount of zinc oxide added and the electrolyte in the separator and the negative electrode migrates into the positive electrode, resulting in increase of the internal pressure of battery to cause the reduction of capacity. The reason for the discharge time decreasing when the amount of zinc oxide added is 550 mg (battery H) is that the utilization of the active material of the positive electrode decreases.

EXAMPLE 3

In the same manner as in Example 1, negative electrodes and separators were prepared with changing the amount of zinc oxide added to the negative electrode and the separator, namely, 0, 0.3, 0.5, 10, 15 and 20 mg. As the positive electrode, the same one as used in Example 1 which contained 80 mg of zinc oxide per Ah of battery capacity was used. Batteries were constructed using these negative electrode, negative electrodes and separators in the same manner as in Example 1 and the number of charging and discharging cycle (before deterioration to 40% of the initial discharge time) and the discharge time in the first cycle were examined. The results are shown in Tables 2 and 3.

TABLE 2

Relation between the amount of zinc oxide added to the negative electrode and the number of charging and discharging cycle and the discharge time

| Battery | Amount of zinc oxide | Number of charging and discharging cycle | Discharge time |
|---------|---------------------|------------------------------------------|----------------|
| A | 0 mg | 400 cycles | 60 min |
| B | 0.3 mg | 510 cycles | 60 min |
| C | 0.5 mg | 560 cycles | 60 min |
| D | 10 mg | 650 cycles | 60 min |
| E | 15 mg | 660 cycles | 60 min |

TABLE 2-continued

Relation between the amount of zinc oxide added to the negative electrode and the number of charging and discharging cycle and the discharge time

| Battery | Amount of zinc oxide | Number of charging and discharging cycle | Discharge time |
|---------|---------------------|------------------------------------------|----------------|
| F | 20 mg | 700 cycles | 55 min |

TABLE 3

Relation between the amount of zinc oxide added to the separator and the number of charging and discharging cycle and the discharge time

| Battery | Amount of zinc oxide | Number of charging and discharging cycle | Discharge time |
|---------|---------------------|------------------------------------------|----------------|
| G | 0 mg | 400 cycles | 60 min |
| H | 0.3 mg | 510 cycles | 60 min |
| I | 0.5 mg | 560 cycles | 60 min |
| J | 10 mg | 650 cycles | 60 min |
| K | 15 mg | 660 cycles | 60 min |
| L | 20 mg | 700 cycles | 55 min |

It can be seen from Tables 2 and 3 that the cycle life of batteries A and G in which zinc oxide was not added to the negative electrode and the separator was 400 cycles which was inferior to those of batteries B-E, H-K of the present invention.

Furthermore, it can be seen that battery L was superior in cycle life, but was inferior in discharge time. Therefore, the amount of zinc oxide added to the negative electrode and separator is preferably about 0.3-15 mg. The deterioration in life of batteries A and G is due to decrease in retention of the electrolyte owing to the absence of zinc oxide. Reduction in the discharge time of batteries F and L is due to reduction in the ionic conductivity of the electrolyte owing to decrease of OH- ion by increase in the amount of zinc oxide added to the separator and negative electrode.

EXAMPLE 4

Figure 3:
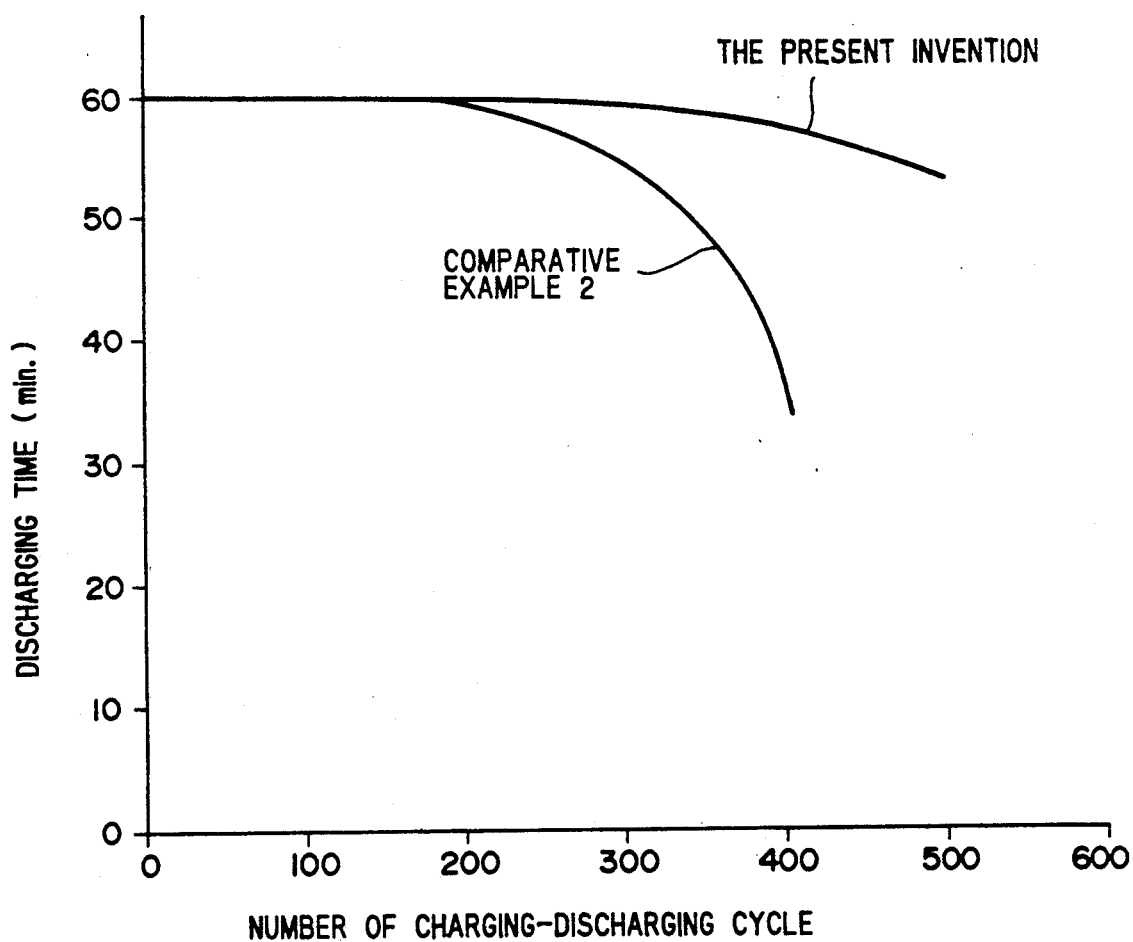
FIG. 3 is a graph which shows the relation between the number of charging and discharging cycle and the discharge time of a battery produced by the method of the present invention and of the battery of Comparative Example 2.

The same hydrogen absorbing alloy powder as used in Example 1 and a zinc oxide powder were mixed at a weight ratio of 99:1 and a hydrogen absorbing alloy negative electrode was produced in the same manner as in Example 1. The thus produced negative electrode contained 100 mg of the zinc oxide powder. A positive electrode was produced in the same manner as in Example 1 by mixing a spherical nickel hydroxide powder, cobalt powder and cobalt hydroxide powder at a weight ratio of 100:7:5. As the separator, was used a sulfonated polypropylene non-woven fabric obtained by sulfonating a polypropylene non-woven fabric too which zinc oxide was not added. An enclosed battery of the same discharge state as in Example 1 was constructed using these positive electrode, negative electrode and separator. Then, initial charging was carried out at 0.1 CmA for 15 hours and discharging was carried out at 0.2 CmA (constant) to 1 V to produce the battery of the present invention. The relation between the number of charging and discharging cycle and the discharge time was examined on this battery and the results are shown in FIG. 3. For comparison, the results obtained on the battery of Comparative Example 2 which contained zinc oxide only in the positive electrode as shown in Example 1 are also shown in FIG. 3.

In the battery of the present invention, zinc oxide added to the negative electrode migrat..s to the positive electrode by the first charging and discharging cycle of the battery and is contained inside the active material particles as a solid solution or inside the active material particles in the state of a zincate ion more uniformly than when the zinc oxide is added to the positive electrode. Furthermore, the zinc oxide is also contained in the negative electrode and the separator.

As a result, the battery of the present invention shows substantially no reduction of the discharge time even after repetition of 500 charging and discharging cycles.

In this example, the addition of zinc oxide to the negative electrode was shown, but similar effects can be obtained when it is added to the Separator or the positive electrode.

As explained above, the present invention provides a nickel/hydrogen storage battery which comprises a nickel positive electrode having nickel oxide as a main active material, a negative electrode mainly composed of a hydrogen absorbing alloy capable of carrying out the electrochemical hydrogen absorbing and desorbing reactions, an alkaline electrolyte and a separator and which has an excellent prolonged cycle life due to inhibition of the expansion of the positive electrode and improvement in electrolyte retention of the negative electrode and the separator which are attained by containing a zinc compound in the nickel positive electrode, the negative electrode and the separator.

Furthermore, a nickel/hydrogen storage battery in which the expansion of the positive electrode is inhibited and the electrolyte retention of the negative electrode is improved and thus the cycle life is prolonged can be provided by the method which includes the step of adding a zinc compound to either one of the negative electrode, separator and electrolyte, the step of constructing a battery with the negative electrode, the separator and the electrolyte, one of which contains the zinc compound and the positive electrode and the step of migrating the zinc oxide to the positive electrode by the first charging and discharging cycle to distribute the zinc compound in the battery at a given ratio, whereby the zinc compound is uniformly dispersed in the negative electrode by a simple method and besides, the zinc compound is also contained in the negative electrode and the separator.

What is claimed is:

1. A nickel/hydrogen storage battery which comprises a nickel positive electrode having a nickel oxide as a main active material, a negative electrode mainly composed of a hydrogen absorbing alloy capable of carrying out the electrochemical hydrogen absorbing and desorbing reaction, an alkaline electrolyte, and a separator, characterized in that the nickel positive electrode, the negative electrode and the separator contain a zinc compound.

2. A nickel/hydrogen storage battery according to claim 1, wherein the zinc compound contained in the nickel positive electrode is present in such a manner that zinc is present in the state of a solid solution, an oxide or a hydroxide in nickel hydroxide which is the main active material.

3. A nickel/hydrogen storage battery according to claim 1, wherein the zinc compound is present in the state of zincate ion in the nickel positive electrode or in the nickel hydroxide which is a main active material.

4. A nickel/hydrogen storage battery according to claim 1, wherein the content of the zinc compound in the nickel positive electrode is 30–500 mg per Ah of battery capacity and the contents of the zinc compound in the negative electrode and the separator are 0.3–15 mg per Ah of battery capacity, respectively in terms of zinc oxide ZnO.

5. A nickel/hydrogen storage battery according to claim 1, wherein when the amount of the electrolyte contained in the nickel positive electrode, that of the electrolyte in the negative electrode and that of the electrolyte in the separator are indicated by X, Y, and Z, respectively, a distribution ratio of the electrolyte is $X:Y:Z = 4-6:2-4:1-3$.

6. A nickel/hydrogen storage battery according to claim 1, wherein the nickel positive electrode having nickel oxide as a main active material is constructed from 3-10 parts by weight of cobalt, 2-15 parts by weight of cobalt hydroxide, 0.2 parts by weight or less of cadmium oxide and 100 parts by weight of nickel hydroxide before construction of the battery.

7. A nickel/hydrogen storage battery according to claim 1, wherein nickel hydroxide used in the construction of the battery for the nickel positive electrode having nickel oxide as a main active material is in the form of spheres.

8. A nickel/hydrogen storage battery according to claim 1, wherein the alkaline electrolyte is a 26–36 wt% aqueous potassium hydroxide solution which contains at least 10 g/l of lithium hydroxide.

9. A nickel/hydrogen storage battery according to claim 1, wherein the alkaline electrolyte is a 26–36 wt% aqueous potassium hydroxide and sodium hydroxide solution which contains at least 10 g/l of lithium hydroxide.

10. A nickel/hydrogen storage battery according to claim 1, wherein the separator comprises sulfonated polypropylene as a main component.

11. A method for manufacturing a nickel/hydrogen storage battery comprising a nickel positive electrode having nickel oxide as a main active material, a negative electrode mainly composed of a hydrogen absorbing alloy capable of carrying out the electrochemical hydrogen absorbing the desorbing reaction, an alkaline electrolyte, and a separator, the nickel positive electrode, the negative electrode and the separator containing a zinc compound, which includes the steps of adding the zinc compound to at least one of the negative electrode, the separator and the electrolyte of the above constructive elements; constructing the battery with the negative electrode, the separator, the electrolyte and the positive electrode and migrating the zinc compound into the positive electrode by initial charging and discharging of the battery to distribute the zinc compound at a given ratio in the battery.

* * * * *